United States Patent [19]

Bellman, Jr. et al.

[11] Patent Number: 4,831,438

[45] Date of Patent: May 16, 1989

[54] ELECTRONIC SURVEILLANCE SYSTEM

[75] Inventors: Alfred H. Bellman, Jr., Germantown, Md.; Mark A. Fowler, Leesburg; Stewart H. Christ, Herndon, both of Va.

[73] Assignee: Household Data Services, Reston, Va.

[21] Appl. No.: 18,465

[22] Filed: Feb. 25, 1987

[51] Int. Cl.[4] .......... H04N 7/18

[52] U.S. Cl. .......... 358/108; 358/210; 89/41.05

[58] Field of Search .......... 358/108, 109, 210, 181, 358/86, 190; 340/534, 518, 541; 380/10; 89/41.05, 41 TV

[56] References Cited

U.S. PATENT DOCUMENTS

| | | | |
|---|---|---|---|
| 4,112,818 | 9/1978 | Garehime, Jr. | 89/41 TV |
| 4,131,893 | 12/1978 | Munson et al. . | |
| 4,287,518 | 9/1981 | Ellis, Jr. . | |
| 4,326,221 | 4/1982 | Mallos et al. | 358/210 |
| 4,462,022 | 7/1984 | Stolarczyk | 340/506 |
| 4,492,978 | 1/1985 | Thomas | 358/134 |
| 4,511,886 | 4/1985 | Rodriquez | 358/108 X |
| 4,630,110 | 12/1986 | Cotton et al. | 358/108 |
| 4,644,845 | 2/1987 | Garehime, Jr. | 358/108 |
| 4,651,143 | 3/1987 | Yamanaka | 358/108 X |
| 4,673,974 | 6/1987 | Ito et al. | 358/108 |

OTHER PUBLICATIONS

Newspaper Item printed in Daily Telegraph newspaper of London, Great Britain, Dec. 3 and 8, 1986.

Undated publication MEDUSA counter terrorism system, Contemporary Systems Design (CSD).

ISS-100 Interactive Surveillance System published in 1976 -HDS.

*Primary Examiner*—James J. Groody

*Assistant Examiner*—Victor R. Kostak

*Attorney, Agent, or Firm*—Burns, Doane, Swecker & Mathis

[57] ABSTRACT

The present invention is a "tethered remote" surveillance system that uses a command and control transmitter/receiver to activate selectively a number of audio and video sensors. The system generally comprises a plurality of remote sensors which are selectively controllable through a plurality of remote integral modules to which the sensors are connected. Each integral module is a physically compact unit which includes an antenna for transmitting the outputs of the plural sensors to a command and control station and an antenna for receiving encrypted command signals from the command station. The command station includes an encrypter for generating the command signals, an antenna for transmitting the signals to the integral modules and an antenna for receiving the signals transmitted by the integral modules, as well as devices for displaying and recording the signals received.

22 Claims, 9 Drawing Sheets

ELECTRONIC SURVEILLANCE SYSTEM

BACKGROUND OF THE INVENTION

The present invention relates to an electronic surveillance system which includes a plurality of audio and video sensors that are selectively activated from a remote command and control station.

Electronic surveillance systems have long been employed in a wide variety of security applications such as monitoring banks and other industrial and military restricted-access areas. In many of these systems, one or more television cameras and microphones are positioned to observe the area to be monitored and the sensors are connected by electric cables to a remotely located command post such as a guard or police station. The cameras often have several controllable functions such as variable lens aperture, focus and zoom, and they may be mounted on motorized pan and tilt translators. Other surveillance systems have avoided the limitations of a cable connection between the sensors and the command station by using a radio-frequency communication link of some kind.

A surveillance system in which the sensors are linked by coaxial cable to the central station is disclosed in U.S. Pat. No. 4,511,886. A plurality of video cameras and microphones are provided for monitoring a number of locations such as cash register positions. The outputs of the sensors are sampled sequentially by a video switcher and converted to compressed, single sideband signals to conserve the bandwidth required of the coaxial cable. Coding information is included in the transmitted signals for identifying which of the plural sensors is activated and unauthorized interception of the signals is prevented by randomly varying the frequency of the signal carrier.

Another surveillance system is disclosed in U.S. Pat. No. 4,326,221 in which a plurality of audio-video sensors are linked to a central station through a radio frequency transceiver. The sensors are individually addressed and controlled in response to a series of tones by which the lens aperture, focus and zoom settings of the cameras are operated. Signals received at the central station are recorded and displayed as desired and the central station may be activated by an intrusion sensor at the remote location. Since the sensors and central station are not linked by a cable, either or both may be mobile.

The surveillance systems described above are intended for permanent installations in which considerations of physical size, power consumption and reliability are of limited importance. In many security applications these become critical. The monitoring and protection of commercial aircraft is one such application where the size, weight, power and reliability of the airborne components of the surveillance system is of special concern. Also, neither of the systems already described is directed to providing security for the surveillance system itself or for the command signals transmitted to the sensors by the monitoring station. Further, it is often important that the surveillance system should not be visible to personnel in or around the area being monitored and that the system should be easily installed in an existing facility with a minimal amount of disruption. To prevent unauthorized activation of the system or interception of the surveillance information, it is also desirable that the command signals and sensor signals be encrypted

SUMMARY OF THE INVENTION

Accordingly, the system of the present invention generally comprises a plurality of sensors which are selectively controllable through a plurality of integral modules to which the sensors are connected. Each integral module includes an antenna for transmitting the outputs of the plural sensors to a command and control station and an antenna for receiving encrypted command signals from the command station. The sensors and integral modules are energized by an electric power supply. The command station includes an encrypter for generating the command signals, an antenna for transmitting the signals to the integral modules and an antenna for receiving the signals transmitted by the integral modules as well as a means for displaying and recording those signals received. A power supply is also provided for the command station.

BRIEF DESCRIPTION OF THE DRAWINGS

The present invention will be more clearly understood from the following detailed description read in conjunction with the drawings in which.

Figure 7:
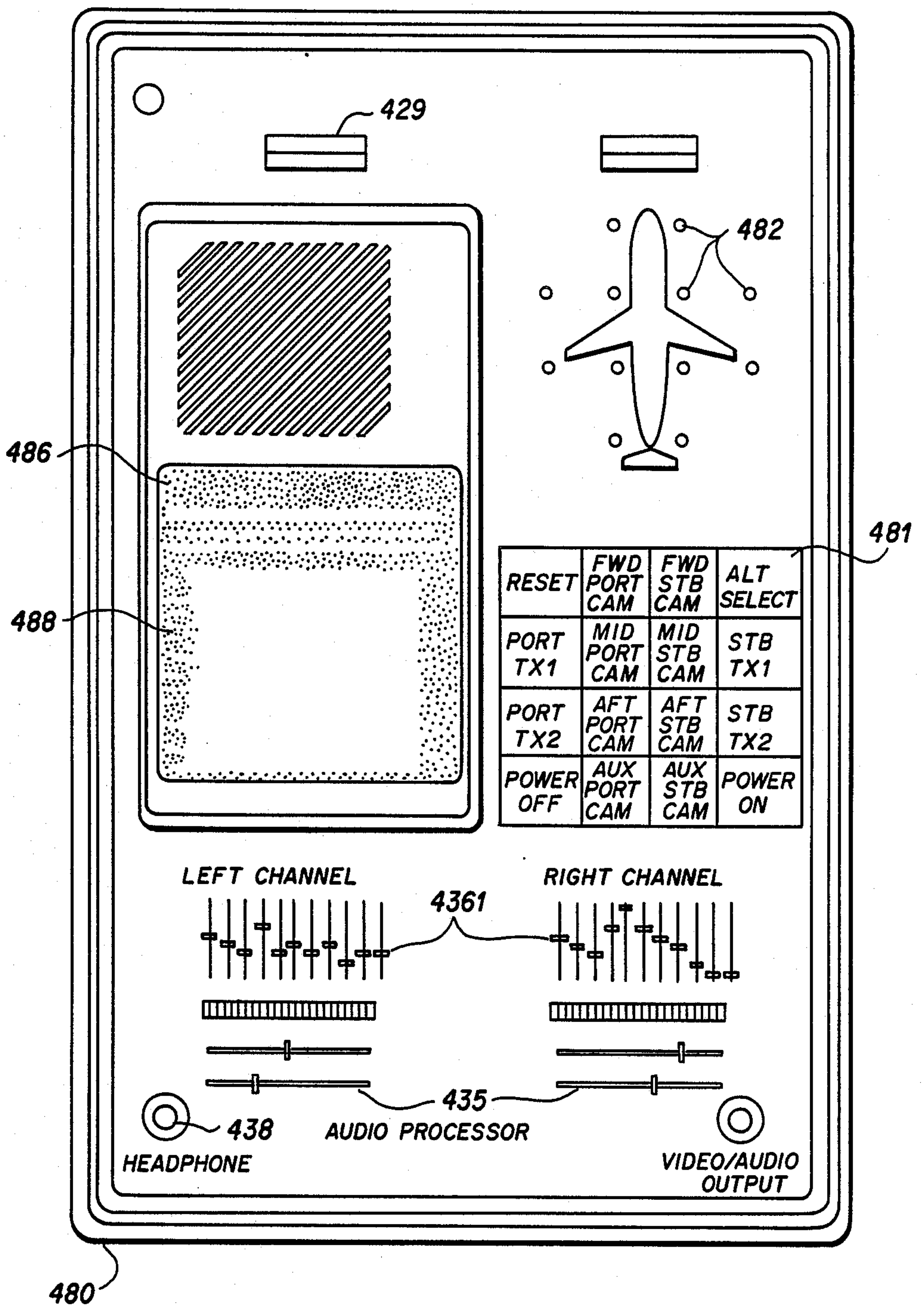

FIG. **6*a*** is a block diagram of an embodiment of the command and control unit of the present invention;

FIG. **6*b*** is a block diagram of the signal separator module of the command and control unit of the present invention;

FIG. 7 is an illustration of the front panel of the command and control unit of an embodiment of the present invention;

FIG. **8*a* is a flowchart for the command encrypter module 470**; and

FIG. **8*b* is a flowchart for the command decrypter 170**.

DETAILED DESCRIPTION

The present invention is a "tethered remote" surveillance system that uses a command and control transmitter/receiver to activate selectively a number of audio and video sensors. In general, the command station is remote from the area under surveillance by the sensors and either or both locations may be mobile. The description which follows assumes that the area under surveillance is the interior of an aircraft; however, it will be understood that the system of the present invention may be adapted to many other environments such as industrial or military restricted-access areas. Also, the system of the present invention may be mounted in aircraft such remotely piloted vehicles or helicopters to provide surveillance of areas outside the aircraft.

Figure 1:
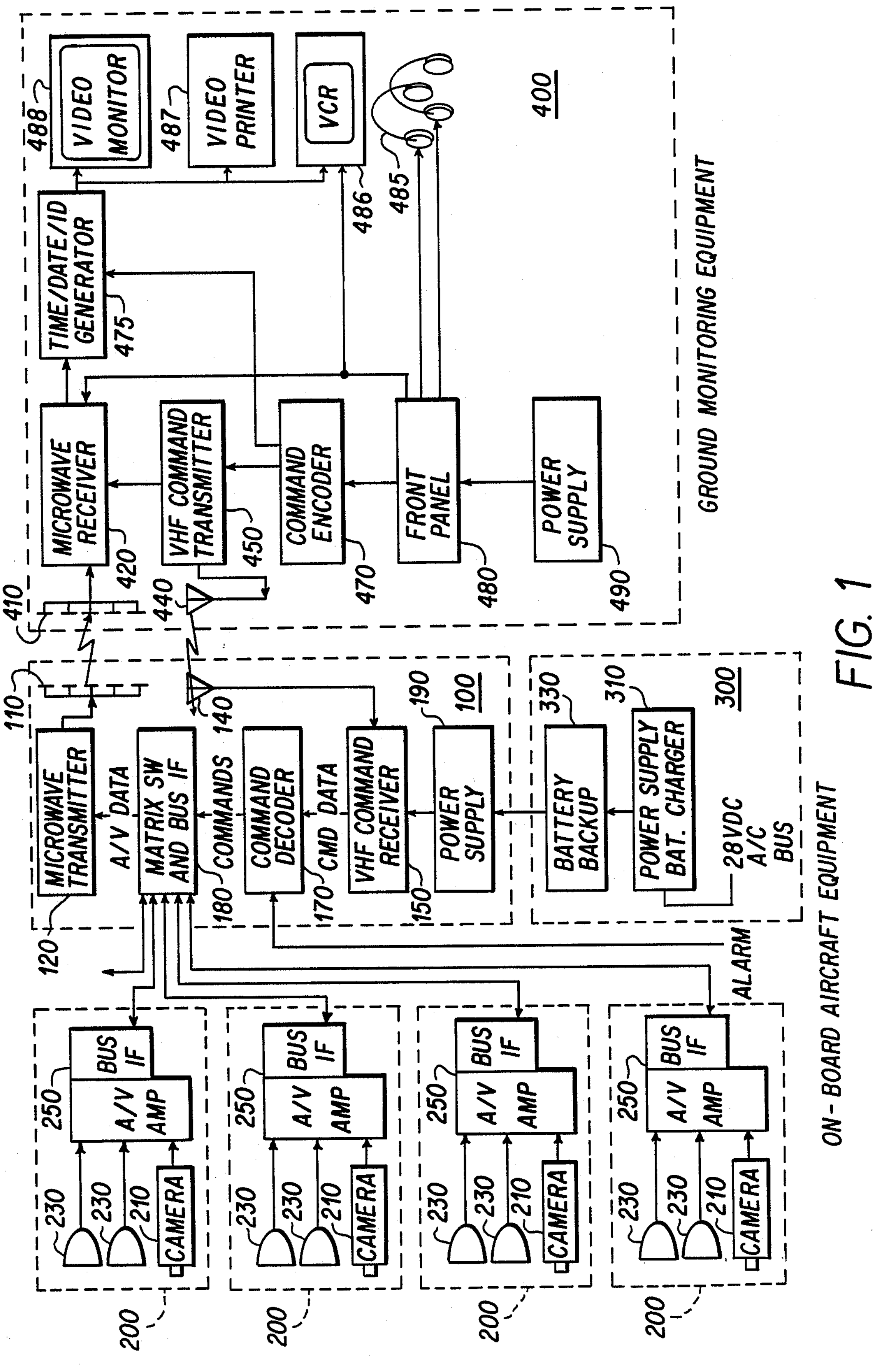
FIG. 1 is a block diagram of a surveillance system in accordance with the present invention.

As shown by the block diagram of FIG. 1, the system of the present invention comprises an integral module 100, a plurality of audio and video sensors 200, a power supply 300 and a command and control unit 400. The integral module 100 communicates via a radio frequency link with the remotely located command and control unit 400. In a typical commercial aircraft installation, at least two integral modules 100 would be provided, e.g., one on each side of the aircraft, so that communication could be established with the control unit 400 regardless of the orientation of the aircraft relative to the control unit. An important advantage of the present invention is that the integral modules 100 and sensors 200 are physically compact and may be covertly installed on an existing aircraft without modification of the airframe or perforation of the pressure vessel.

As explained in greater detail below, each integral module 100 comprises a microwave transmit antenna 110 and a microwave transmitter 120, a VHF receive antenna 140 and a VHF receiver 150, a command decrypter 170 and switch means 180, and a power supply 190. It will be understood that any suitable radio frequencies may be employed for transmission and reception, the selection being limited mainly by antenna size and spectrum crowding considerations. The integral module 100 constantly listens for activating commands transmitted from the control unit 400. The activating commands are suitably encrypted to prevent unauthorized operation of the surveillance system. These commands are decrypted by the microprocessor-based command decrypter 170 which in response directs the operation of the switch means 180 and the sensors 200. The two antennas and the electronics of an integral module 100 are preferably packaged in a single enclosure which is mounted totally within the aircraft. This makes an installation on a window reveal, fascia or interior surface of the fuselage quick and inexpensive as well as readily concealable. In the typical surveillance application, it is usually desirable that the surveillance itself be accomplished covertly. The compactness of the integral module 100, and the lack of a requirement for an externally mounted antenna contribute to the "invisibility" of the surveillance system.

Each of the sensors 200 comprises at least one video camera 210 and at least a pair of microphones 230 together with support electronics 250. The support electronics 250 combines the output signals of the camera 210 and microphones 230 into a composite sensor signal comprising a baseband video signal and two audio subcarrier signals, all of which is upconverted to an appropriate VHF signal for connection via coaxial cable to the integral modules 100. Thus, the support electronics operates in a manner similar to conventional CATV-type systems. As explained in further detail below, each sensor 200 is packaged in a compact unit to permit a quick, concealed installation proximate or within the area to be monitored. With the commercial availability of charge-coupled device video cameras with auto-iris pinhole lenses and sensitive microphones, each sensor 200 can be positioned so as to be totally invisible to the area under surveillance and even to the normal maintenance personnel working in the area.

The electric power requirements of the integral modules 100 and the sensors 200 are met by a power supply 300 which comprises two self-contained sub-units: a power unit 310 and a battery-backup unit 330. The power supply 300 is designed to continue operating when all other equipment aboard the aircraft or associated with any other area under surveillance has been powered down, whether intentionally or through power failure. For increased security and air safety, the power supply 300 may not have a power circuit breaker in the cockpit of the aircraft, thus the supply 300 is designed for highly reliable operation, requiring at least three of its protective devices to fail shorted before a serious problem can arise. No external source of electricity is necessary to operate the surveillance system of the present invention. The power unit 310 provides automatic switching between any available power source, including the standard 28 VDC aircraft power bus, an auxiliary power unit, and the battery-backup unit 330. The power unit 310 includes a battery charger for maintaining the battery-backup unit 330 fully charged.

The command and control unit (CCU) 400 is generally located remote from the integral modules 100, sensors 200 and power supply 300 but selectively communicates with one or more integral modules via an assigned radio frequency channel. The command and control unit 400 comprises a microwave receive antenna 410 and a microwave receiver 420, a VHF transmit antenna 440 and a VHF transmitter 450, a command encrypter/control processor 470 and a front panel 480, and a power supply 490. The command and control unit 400 also comprises means for displaying and reproducing the outputs of the sensors 200 which are transmitted by the integral module 100; the means may include audio headphones 485, a video tape recorder 486, a video printer 487 for producing a paper copy of the video image received by the command and control unit 400, and a video monitor 488 for displaying in real-time the video signal transmitted by the selected sensor and integral module. A suitable time/date character generator is also included in the CCU 400 for superimposing one or two lines of text on the surveillance video near the bottom of the frame. For some applications the CCU 400 may optionally include a suitable modem for coupling the signals received from the integral modules onto another communication link such as a telephone line or satellite transmission system.

When information from the surveillance system of the present invention is required, the command and control unit (CCU) 400 is actuated by entering a series of unique authorization codes, for example, through an array of switches mounted on the front panel 480. The authorization codes may include a user password, a country identification code word, and an aircraft identification code word such as an aircraft's tail number. The use of multiple levels of authorization codes allows the system of the present invention to cope with the many political and legal aspects of the international air transport system. After the authorization codes are accepted by the CCU, an integral module and sensor are selected from the switch array and an encrypted message is sent from the command and control unit 400 to the remote integral modules 100 and sensors 200. The integral modules decrypt the message and activate the selected module and sensor; once activated, the module continuously transmits the output of the selected sensor for a predetermined time period, e.g. 30 minutes. If no further commands are received by the modules within the predetermined time period, the selected module and sensor are automatically deactivated.

Figure 2:
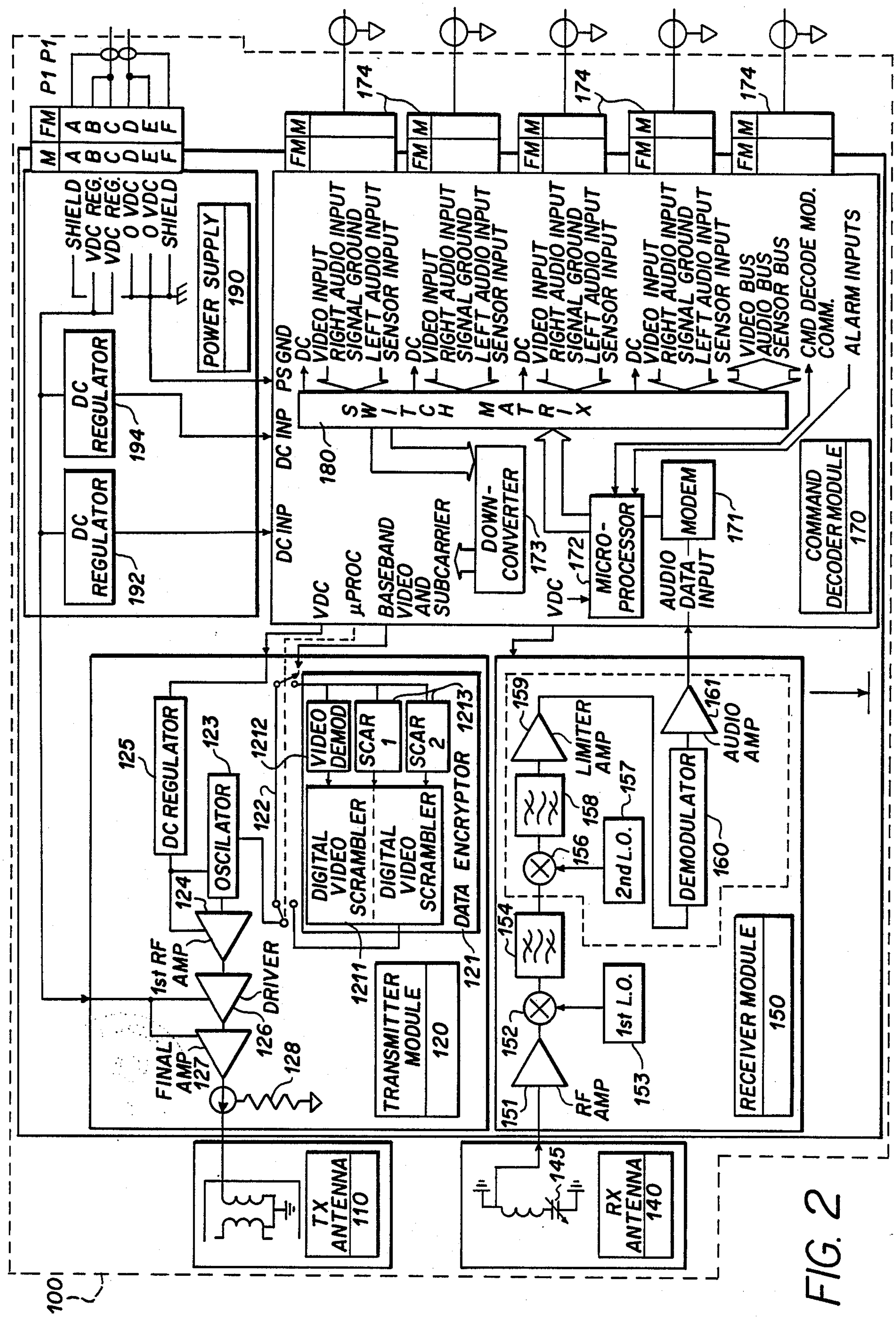
FIG. 2 is a block diagram of an integral module of the present invention.

Referring to FIG. 2, each integral module 100 includes a microwave transmit (TX) antenna 110 which is advantageously a resonant-cavity-backed, microstrip dipole operating at L-band in the radio frequency (RF) spectrum. A simplified lumped-element representation of the antenna is shown in the figure. This type of TX antenna is highly efficient in converting input electrical power into output transmitted power. The TX antenna 110 is also physically compact with wide beamwidth, providing the small size necessary for aircraft use and the ability to establish communication independent of antenna orientation.

The TX antenna 110 is driven by a microwave TX module 120 which includes suitable RF preamplifiers and power amplifier 124–127 that are isolated from the antenna by an RF isolator 128. The amplifiers 124–127 magnify the output voltage of a conventionally frequency-modulated oscillator 123 to an appropriate output power level, e.g. four watts. The output power level provided by the TX module 120 is determined according to the desired maximum range as constrained by the sometimes limited electric power available to the surveillance system.

The frequency of the oscillator 123 is modulated either by clear signals from the sensors 000 or by scrambled versions of those signals according to the position of a CLEAR/ENCRYPT switch 122 which is controlled by the microprocessor controller 172. In the CLEAR position shown, the upconverted composite video and audio signal from the sensors 200, is conducted directly from the switch means 180 for modulation of the frequency of the oscillator 123. When the switch 122 is placed in the ENCRYPT position, the composite signal from the sensors 200 is conducted to an encrypt module 121 for scrambling the output of the selected sensor. The encrypt module 121 includes a video demodulator 1211 and a pair of audio subcarrier demodulators 1212 for down converting to baseband and separating the video signal and the audio signals from the camera 210 and the microphones 230 of the selected sensor 200. These signals are then encrypted by a suitable video/audio scrambler 1213. A suitable scrambler makes the clear audio and video signals unintelligible to any who are unauthorized to receive them. The operation of a suitable scrambler 1213 is described in the U.S. patent application of Walter T. Morrey et al, entitled "A Television Scrambling System", which is commonly assigned with the present invention and was filed on even date herewith.

The TX module 120 further includes a suitable DC regulator 125 providing stable electric power to the carrier oscillator 123 and the first RF preamplifier 124.

Commands from the control unit 400 are received by the integral module 100 through the VHF receiver (RX) antenna 140. FIG. 2 shows a lumped-element representation of the RX antenna 140 including a tunable element 445 for maximizing the sensitivity of the combination of the RX antenna and the VHF receiver 150. Since the integral module must be physically compact, the tunable element 145 allows the physically small VHF antenna to be "longer" electrically, thus more nearly matching the fractional wavelength appropriate for good reception. Digital commands are received as a frequency-shift-keying (FSK) modulation of a suitable VHF carrier signal, although other suitable types of modulation may be used alternatively. FSK allows a data transmission rate, e.g. 300 to 1200 bits per second, higher than that of DTMF (which is limited to only about 50 bits per second) to be used in the present invention.

A low-level signal received by the RX antenna 140 is input to the conventional VHF receiver 150 wherein it is amplified by a suitable RF amplifier 151. A higher-level signal output by the amplifier 151 is heterodyned in a mixer 152 with a signal from a local oscillator 153. The upper sideband and residual local oscillator components of the output signal from the mixer 152 are blocked by an appropriate bandpass filter 154 which passes the lower sideband component to a second mixer 156. The second mixer 156 combines the lower sideband component with an output signal from a second local oscillator 157. The upper sideband and residual second local oscillator components of the output signal from the second mixer 156 are blocked by another bandpass filter 158. The lower sideband component of the output signal of the second mixer 156 is passed by the filter 158 to a limiter amplifier 159 which preserves the frequency variations of the lower sideband component but eliminates any amplitude variations. The output of the limiter 159 is passed to a suitable demodulator 160, e.g. a differentiator circuit, which converts the baseband frequency variations of the lower sideband component into an amplitude-varying, e.g. digital, command signal. Finally, the demodulated command signal is magnified by an appropriate audio-frequency amplifier 161.

The demodulated and amplified command signal from the amplifier 161 is passed t the command decrypter 170 in the integral module 100 wherein a modem 171 appropriately conditions the command signal for input to a suitable microprocessor controller 172. The microprocessor 172 includes appropriate firmware instructions for decrypting the digital command signal and, in response, controlling the operation of the CLEAR/ENCRYPT switch 122 and of a switch matrix 180. The switch matrix 180 functions as a 5:1 multiplexer in that it selectively connects one of five coaxial signal lines input to the decrypter 170 to one set of signal lines output from the decrypter. The output signal lines are appropriately connected to the transmitter module 120 described above, and carry the video and audio signals from the selected sensor 200 and DC power to the regulator 125. The switch matrix 180 also can advantageously connect one input signal line to another as described in more detail below. The selection by the switch matrix 180 under the control of the microprocessor 172 of one of the five signal lines input to the decrypter 170 accomplishes the selection of one of the sensors 200. The microprocessor controller 172 is advantageously reprogrammable either in whole or in part, by use of electrically erasable read-only memory (EEROM) as the program storage device. The use of such a device allows the internal control firmware such as the various authorization codes of the microprocessor to be changed from the command and control unit 400.

The command decrypter 170 also includes one or more alarm inputs which can be provided by any suitable intrusion detector such as a passive IR or monostatic doppler intrusion sensor. The alarm inputs serve to activate the surveillance system used in a maintenance monitoring mode in the event of an unauthorized entry into the area under surveillance. When an intrusion is sensed, the command decrypter 170 activates a predetermined one of the sensors 200 and causes an alarm message to be transmitted by the transmitter 120. The alarm message is received by the command and control unit 400 which emits an audible tone to alert an operator to the intrusion event.

The signals input to the switch matrix 180 are brought in through suitable coaxial connectors 174 and 175. Video and audio signals from a given sensor 200 and DC power to that sensor pass through one of the connectors 174, while a bus connector 175 may be provided for signals from and to another integral module and for the signals from the intrusion sensors. In this way, up to eight individual sensors may be selectively connected to two integral modules, either one of which can communicate with the remote control unit 400. Also, providing DC power to a sensor 200 and receiving signals from the sensor through a single coaxial cable affords significant savings in weight to the system of the present invention.

The command decrypter 170 further includes a down converter 173 for reconverting the sensor signals input to the integral module 100 back to baseband composite audio-video signals.

Finally, a power supply 190 is also included in the integral module 100 to provide stable, appropriate operating voltages to the decoder and controller 170, the transmitter module 120 and the receiver module 150. The power supply 190 generally includes a plurality of voltage regulators 192 and 194 which convert the level of the available DC voltage, e.g. 24–28 volts in a typical aircraft, to levels required by the surveillance system, e.g. 5 and 12 volts. The supply 190 provides continuous power to the VHF receiver 150 and the microprocessor 172 and modem 171. When the command signals are received, power is supplied to the sensor selected and the microwave transmitter 120.

Figure 3:
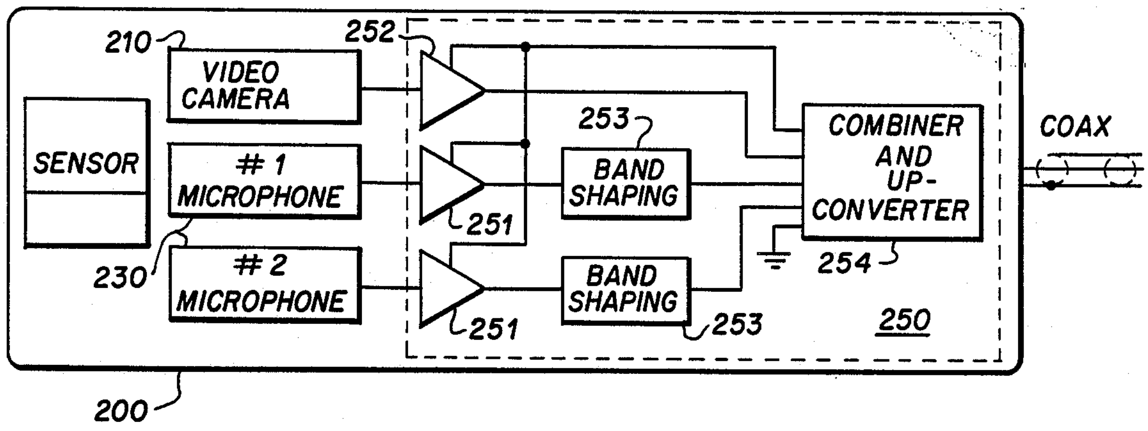
FIG. 3 is a block diagram of an embodiment of the audio/video sensor of the present invention.

Referring to FIG. 3, each sensor 200 includes at least one video camera 210 and a plurality of microphones 230. The video camera 210 can be a conventional unit, such as those manufactured by RCA and Sony or a device specially designed for low light levels or infrared imaging. For an aircraft, the important considerations of low size, weight and power requirements may be met by use of charge-coupled-device or other semiconductor-based imaging devices. The camera 210 may also be advantageously provided with a pinhole lens having variable focus, aperture, and zoom functions which can be controlled in response to control signals from the decrypter 170. The microphones 230 may also be commercially available units such as the BT-series manufactured by Knowles which provide good sensitivity with small size and limited directivity. At least two microphones are included to provide either stereophonic operation or background noise cancellation. Since the typical aircraft is often quite a noisy environment, one of the microphones 230 can be positioned to pick up only the ambient noise; after transmission to the command and control unit 400, the components of the output signal of the reference microphone can be subtracted from the correlated components of the output signal from the other microphone. In this way activity inside the aircraft can be more easily understood.

Also included in the sensor 200 are support electronics 250 consisting generally of logarithmic audio amplifiers 251 and a video amplifier 252, audio bandshaping filters 253 and combiner and up converter electronics 254. Depending on the characteristics of the video camera 210, the video amp 252 may not be included in the sensor 200. The amplifiers 252 and 251 magnify the voltage levels of the output signals from the camera 210 and the microphones 230 to levels suitable for conduction to an integral module 100. The logarithmic compression provided by the audio amps 251, and the filtering help overcome electrical noise which can corrupt the signals on the coaxial signal lines. The combiner and up converter electronics 254 includes suitable video carrier and subcarrier generators which form and upconvert the composite audio and video output signal from the sensor, allowing the single coaxial cable to carry signals to the integral module 100, and signals and DC power from the module 100. Thus, the support electronics 250 operates in a manner similar to conventional CATV-type systems. An electrical coaxial connector 256 is provided on the sensor 200 for convenient connection of the sensor to a suitable coaxial cable.

With proper selection of commercially available components, each sensor 200 can be configured in a very small package which is readily concealed in or near the area under surveillance. In a typical aircraft environment, a sensor 200 may be installed in the aircraft's overhead in a wide variety of locations, such as behind the seatbelt and no-smoking warning signs. Only small apertures are necessary for sound and images to pass through the signs to the microphones and cameras, and these may be easily masked. Also, the sensor 200 may be installed and packaged as an integral part of already existing aircraft interior components so that even the normal maintenance personnel working in the aircraft are unaware of the presence of the sensors 200.

Figure 4:
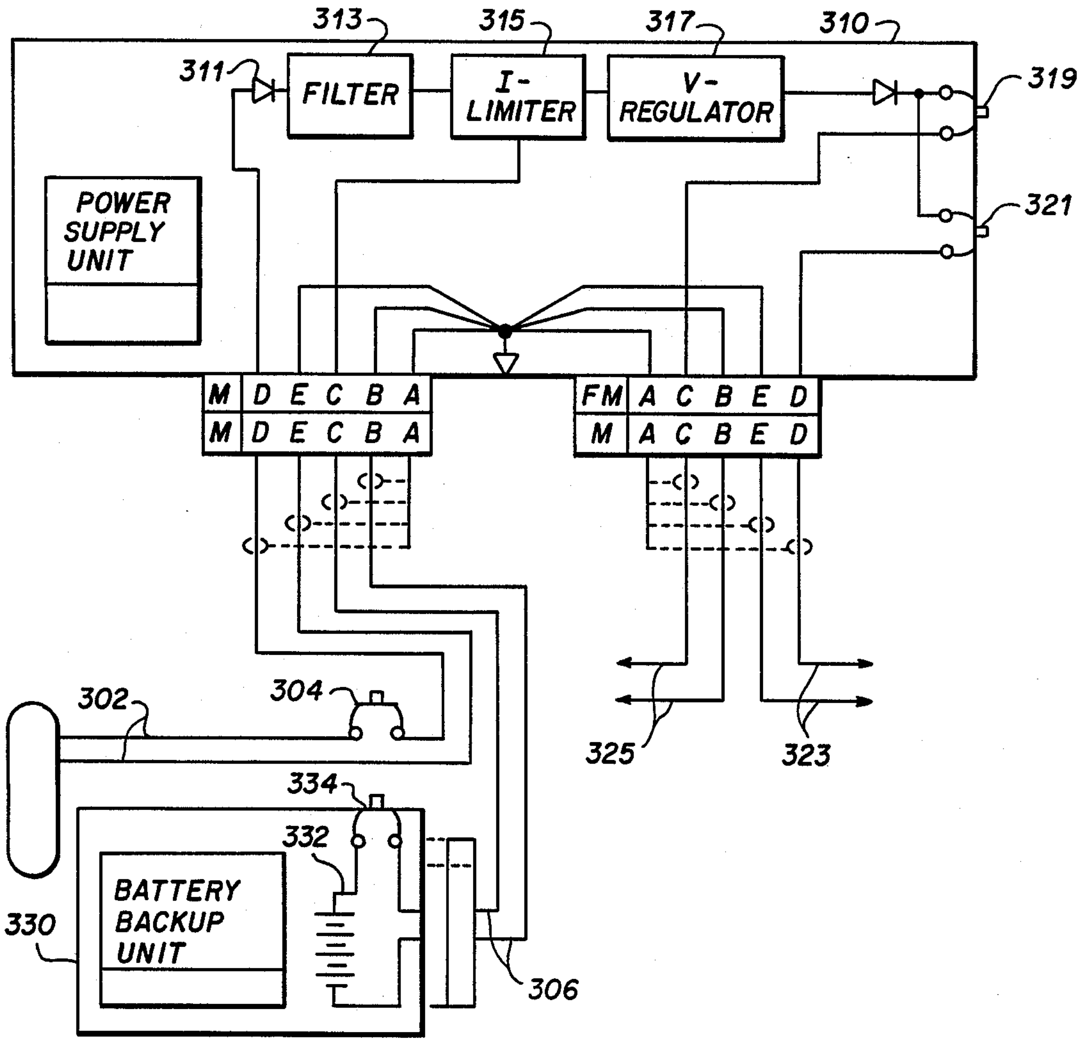
FIG. 4 is a block diagram of the power supply of the present invention.

Referring to FIG. 4, the electric power requirements of the integral modules 100 and the sensors 200 are met by the power supply 300 which comprises the power unit 310 and the battery backup unit 330. Electric power from a main supply such as an aircraft power bus or an auxiliary power unit is provided to the power unit 310 through suitable conductors 302 and a circuit breaker or other protection device 304. The power unit 310 includes a diode 311, a suitable EMI filter 313, a current limiter 315 and a voltage regulator 317 which cooperate conventionally to produce stable electric power from the generally noise- and voltage-transient-corrupted main supply. Circuit breakers 319 and 321 are also provided in the conductors 323 and 325 to the integral modules 100.

The current limiter 315 also comprises a charger for the battery backup unit 330. Electric power to and from the battery backup unit 330 is provided through a pair of suitable conductors 306. It is readily observed from the drawing that the diode 311 prevents the reverse flow of electric current from the power unit 310 or battery backup unit 330 into the main supply conductors 302. Thus, when the main supply is deactivated, the power supply 300 continues to supply only the integral modules 100 and sensors 200 from a suitable number of rechargeable batteries 332 in the battery backup unit 330.

To enhance the security provided by the surveillance system of the present invention, especially when the area under surveillance is the interior of an aircraft, the power supply 300 should not be easily deactivated. In an aircraft environment, therefore, the circuit breakers 304, 319, 321 and 334 are preferably not located in the cockpit where the aircraft's crew or others have ready access to them. However, it is simultaneously most important that the surveillance system not compromise the safety of the aircraft in the event of an electrical failure. Accordingly, the power supply 300 provides at least triply redundant protection against any short-circuit failures of the protection devices 304, 315, 319, 321 and 334.

Figure 5:
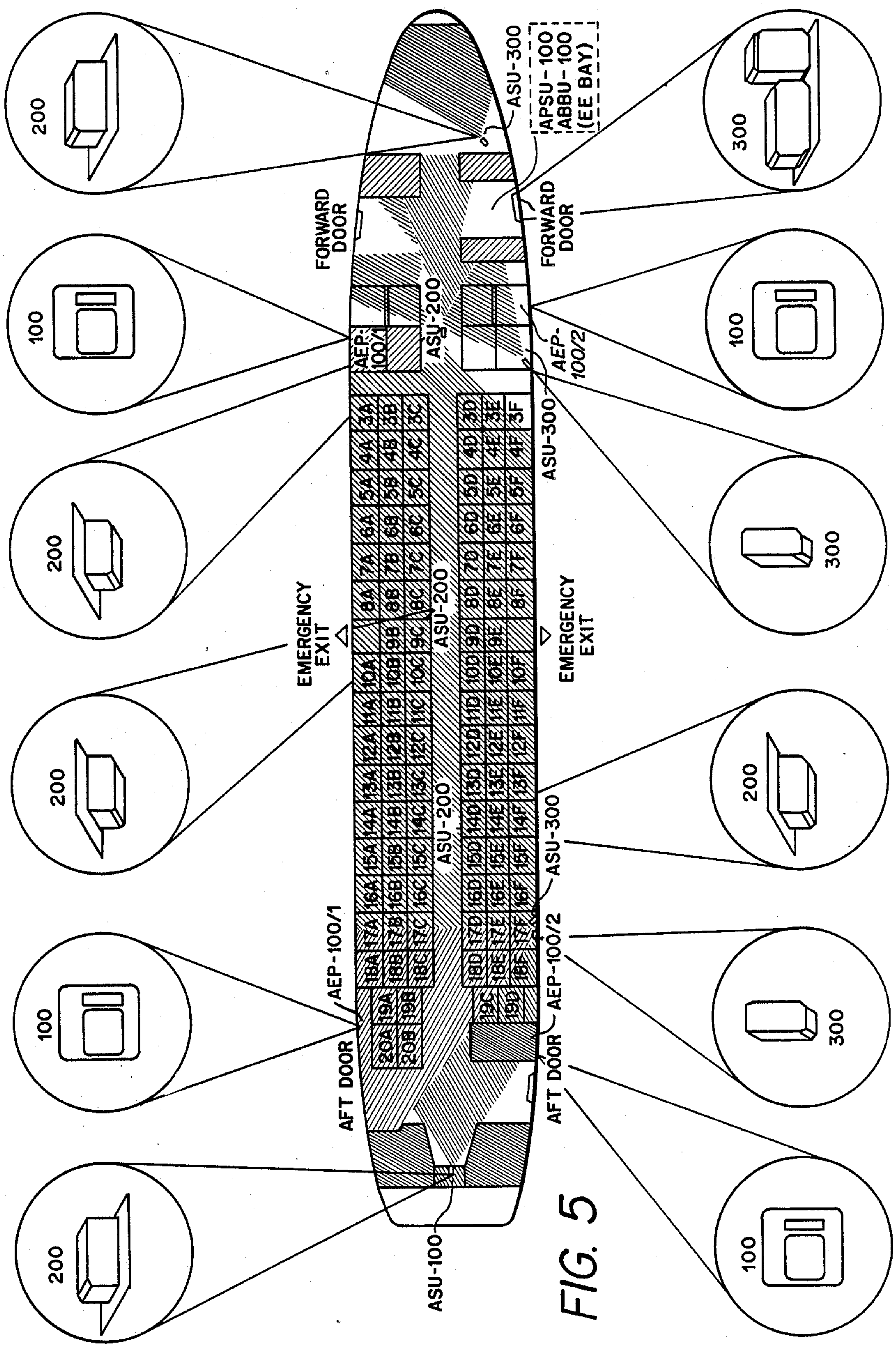
FIG. 5 is an illustration of an arrangement of the present invention in an aircraft.

In keeping with the present description which is exemplary of an aircraft interior as the area under surveillance, FIG. 5 shows one possible arrangement of four integral modules 100, seven audio and video sensors 200 and a power supply 300 within a commercial aircraft such as a Boeing 727. The shaded areas in the figure represent the typical fields of regard of the video cameras in the sensors. The integral modules 100 are preferably mounted at window level, for example, behind the lavatories or galley, thus completely concealing their location from occupants of the aircraft. The seven sensors 200 shown are arranged to give overlapping coverage of the aircraft's interior. Additional sensors 200 can be provided for surveillance of the cargo bays, although these are not shown in the Figure for clarity.

Figure 6A:
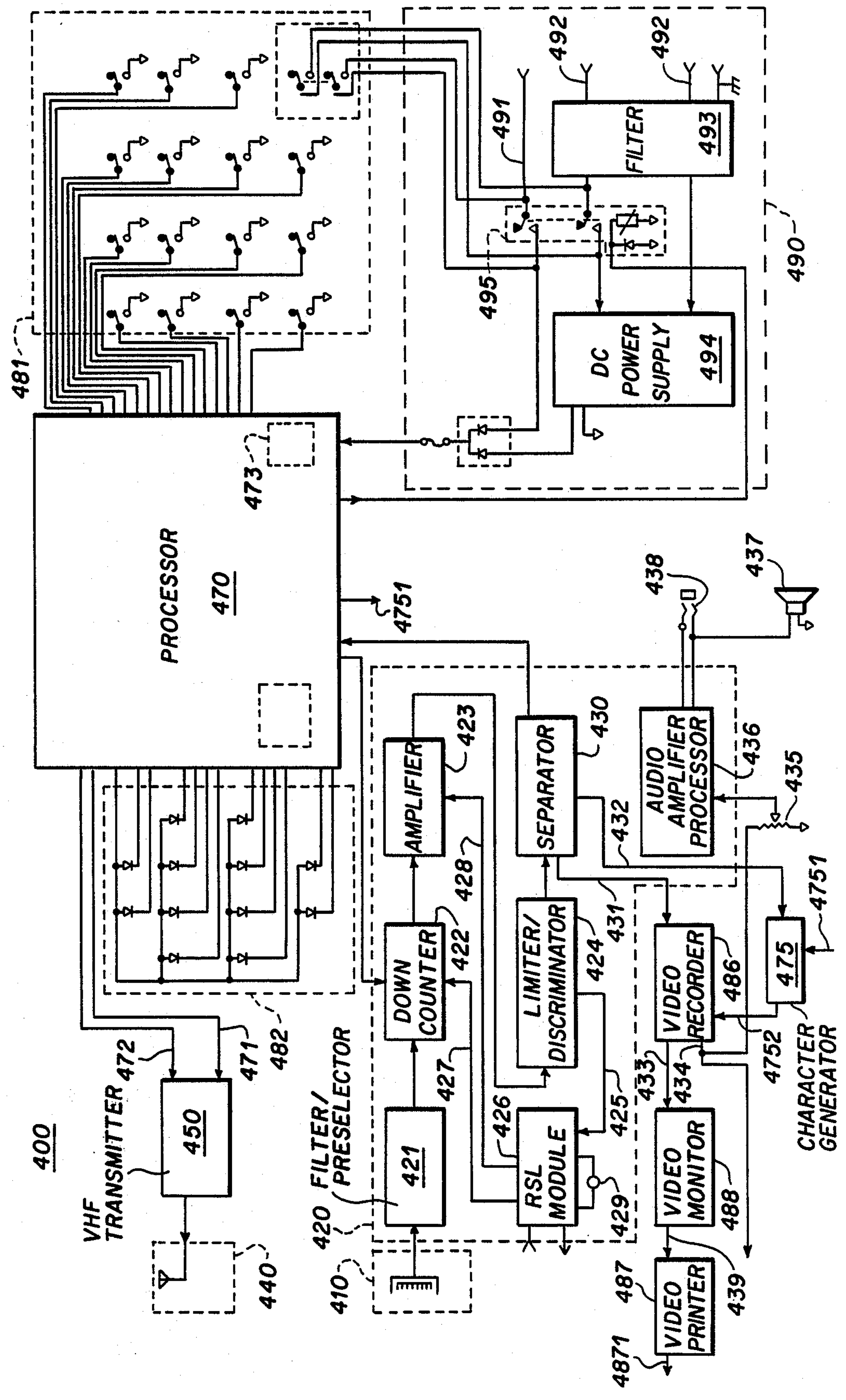
Figure 6B:
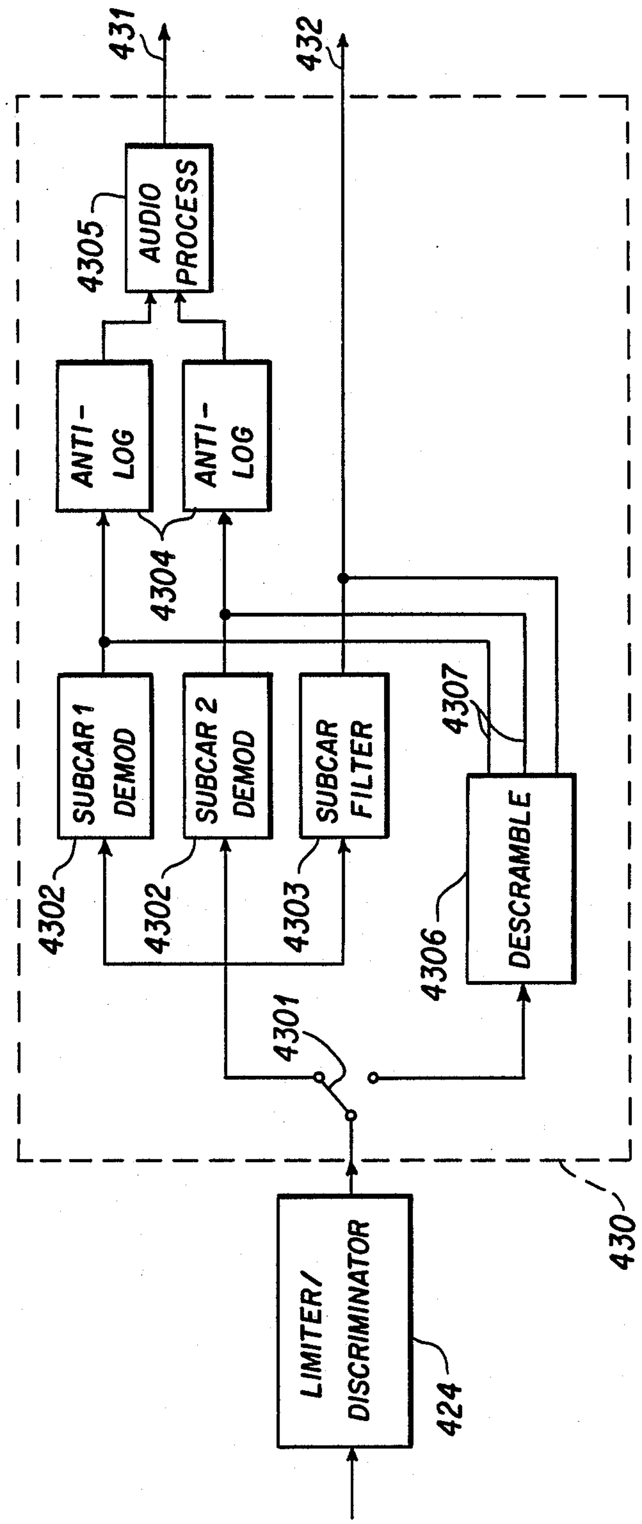

The integral modules 100, sensors 200 and power supply 300 are activated and controlled by the command and control unit (CCU) 400 shown in FIG. 6. The CCU 400 also receives and displays the signals from a selected sensor which are transmitted by an integral module 100 as well as the alarm message transmitted in response to an intrusion. These signals are received by a microwave receive (RX) antenna 410 which is advantageously a microstrip array operating at L-band. The low-level, amplitude- and frequency-modulated, composite audio-video signal received by the RX antenna 410 is passed to a conventional microwave receiver 420.

The receiver 420 includes a narrow bandpass filter or preselector 421, a downconverter 422 and a narrowband, variable gain amplifier 423. The function of these elements is to produce a higher level, lower frequency signal corresponding to the lower level, higher frequency signal received by the RX antenna 410. The downconverter 422 typically includes at least one mixer and voltage-controlled oscillator for frequency-translating the L-band signal from the RX antenna to a suitable lower frequency. The downconverter operating frequency is determined in response to a control signal from the command encrypter/control processor 470. The amplifier 423 magnifies the output of the downconverter 422 with a variable gain which is responsive to a control signal. The narrow bandwidth of the amplifier 423 also filters the output of the downconverter 422.

The output of the amplifier 423 is then input to a limiter/discriminator module 424 which functions in a conventional manner similar to the amplifier 159 and demodulator 160. The module 424 also derives a signal 425 which is related to the strength of the output of the amplifier 423. The signal 425 is used by a received signal level (RSL) module 426 which generates in a well-known manner the control signals 427 and 428 for the oscillator in the downconverter 422 and the amplifier 423. The RSL module 426 may further operate a suitable signal strength meter 429 for providing such information to a system operator.

The output of the limiter/discriminator module 424, comprising the baseband composite audio-video signal is passed to a separator module 430, shown in more detail in FIG. *6b*. The separator module comprises a CLEAR/DESCRAMBLE switch 4301 that can be located on the front panel 480 to direct the unscrambled composite signal to conventional audio subcarrier demodulators 4302 and a subcarrier blocking filter 4303. Since the composite signal was unscrambled, the baseband video signal 432 stripped of the audio subcarriers is output directly from the filter 4303. The conventional subcarrier demodulators 4302 convert the audio signals from the selected sensor 200 back to baseband. The logarithmic compression of the audio signals imposed at the sensors 200 is undone by suitable antilog circuits 4304, and the decompressed baseband audio signals are passed to an audio processor circuit 4305. The audio processor 4305 combines the separate audio outputs from the microphones 230 in the selected sensor 200 into a stereophonic-format audio signal. Optionally, the audio processor 4305 may include suitable means for subtracting the audio signal from the reference microphone from the audio signal from the other microphone to remove their correlated components from the audio output signal 431.

When the CLEAR/DESCRAMBLE switch 4301 is placed in its other position the received scrambled composite signal is directed to a suitable descrambling means 4306. A suitable descrambler is also described in the commonly assigned U.S. Patent application of Walter T. Morrey et al. mentioned above. The audio output signals 4307 from the descrambler 4306 are then processed in the same way as the baseband output signals from the subcarrier demodulators 4302.

As described below in connection with another embodiment of the present invention, the separator module 430 may also advantageously output an intrusion alarm message to the encrypto/controller 470.

Referring again to FIG. *6a*, the baseband audio 431 is passed from the separator module 430 to the appropriate input of a suitable conventional video recorder 486. The baseband video 432 is passed to suitable time/date character generator 475 that is advantageously inserted between the receiver 420 and the video recorder 486, video monitor 488 and video printer 487. The time/date character generator 475, under the control of the encrypter/processor 470 via control line 4751, generates one or two lines of text which are superimposed on the video near the bottom of the frame. Pertinent surveillance data is thus presented for future video identification. The data inserted includes, for example, time of day, date, sensor identification number and aircraft identification number. In this way, the time/date character generator fully annotates the circumstances of the received surveillance information. The vide output 4752 from the time/date character generator 475 is then passed to the appropriate input of the recorder 486. The video signal output 433 of the recorder 486 may then be displayed by a suitable video monitor 488 which itself may include provisions for outputting the video signal to other components. A video printer 487 may also be provided to create a hard copy of a video signal output 493 of the monitor 488. Conventional printers 487 include a video frame buffer memory and may optionally include a modem. With a printer 487 so equipped, the system of the present invention can transmit single, fixed frames of video information over suitable communication links such as telephone lines from the printer output 4871. Similarly, the audio output 434 of the recorder 486 is directed to a suitable volume control device 435, which may be mounted on the front panel 480 of the CCU 400, as well as to other components as desired. The volume control 435 controls the level of the output of an audio amplifier and processor 436 which drives a speaker 437 and may be available at a stereo jack 438 for listening devices such as headphones 485. The audio amplifier and processor 436 may include a frequency equalizer for adjusting the relative strengths of different frequency components of the audio signal.

Digital command signals are transmitted from the CCU 400 to the integral modules 100 through the VHF transmit (TX) whip antenna 440. The TX antenna 440 is driven by a conventional FS transmitter module 450 which modulates a suitable carrier with digital command signals 471 from the command encrypter/ control processor 470. The command signals consist of a serial digital data stream by which the integral modules 100 and sensors 200 are selectively activated. The operation of the transmitter module 450 is well-known and will not be further described.

The command encrypter/control processor 470 may comprise a microprocessor or other suitable programmable logic device for translating the ON/OFF status of a keyboard or other array of switches 481 mounted on the front panel 480 into the suitable digital command signals 471. The encrypter/control processor 470 may also drive an array 482 of indicators such as light-emitting diodes (LEDs) so as to advise an operator of the status of the surveillance system. The encrypter/-processor 470 also includes a suitable power supply 473 for operating the array 482, other indicators as required and providing the power to the receiver 420, as well as suitable means for controlling the supply of electrical power 472 to the transmitter 450.

Electric power for the CCU 400 is provided by the power supply 490 which converts the voltage available from a main DC source 491 or an AC source 492 into the voltage levels required by the electronic components of the CCU. For an AC power input, a conventional line filter assembly 493 and an appropriate DC power supply 494 are provided. The supply 490 further includes a relay with protection diode 495 which is energized in a conventional manner by activation of one of the array of switches 481.

FIG. 7 shows an embodiment of the front panel 480 of the CCU 400. The array 481 of switches is used to energize the CCU 400 and to activate a selected one of the plurality of sensors 200 and one of tee integral modules 100. In the figure, the array 481 can activate one of eight sensors and one of four modules, although it will be understood that greater or lesser numbers are also possible. Images from the selected sensor are displayed on the monitor 488 and recorded if desired on the video recorder 486. Audio information from the selected sensor is available at headphone jacks 438 and its volume is adjusted by the control 435. The frequency content of the audio signal is adjusted by the controls 4361, which may be a plurality of slide switches; the switches 4361 direct the operation of the audio equalizer in the audio amplifier and processor 436. The locations of the selected sensor and module are indicated by the array 482 of LEDs which may be arranged as shown so as to suggest the physical configuration of the area under surveillance. A suitable received signal strength meter 429 is also shown.

Figure 8A:
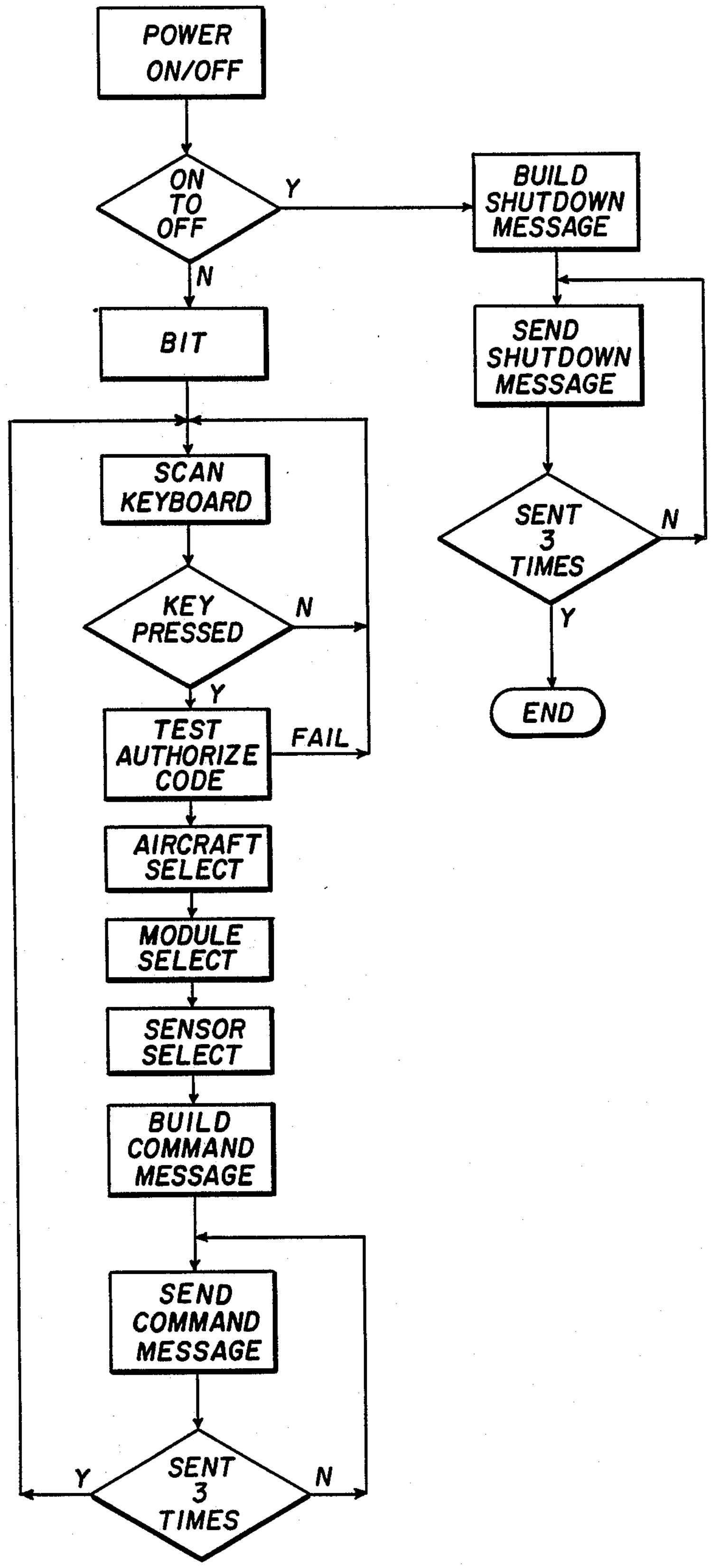

FIG. 8*a* shows a flowchart of the operation of the command encryptor/control processor 470 in the CCU 400. When a CCU power switch on the front panel 480 is depressed, the program determines whether the CCU is to be shut down. If the CCU is not to be shutdown, for example when it is to be powered up, the program executes a suitable built-in test or BIT routine for verifying the operability of the components of the CCU. After the BIT routine has been successfully completed, tee program scans the keyboard array 481 to determine whether and which switches have been activated. If no other keys have been pressed, the program directs continued scanning of the keyboard. If the keyboard has been used, the program tests for the entry of a valid authorization code including a user password and a country authorization code. The user password is preferably arranged to enable the initial operation of the CCU which can access any of the integral modules 100 and sensors 200 within range of its VHF command signal. A separate country authorization code word regulates access to the aircraft of a particular nation-state. Thus, each nation-state can independently control the surveillance of its own air transport fleet or other area under surveillance in the presence of an otherwise authorized CCU. If valid authorization codes are not entered, the program directs continued scanning of the front panel keyboard.

Once the authorization codes are accepted by the CCU, the program accepts entries of an aircraft identification code word such as the aircraft's tail number, the integral module 100 desired for transmission and the sensor 200 selected to have its video and audio outputs transmitted. The program then directs the formation of the binary digital command message to be transmitted by the VHF transmitter 450. The command message is encrypted in the sense that the sequence of bits forming the message does not conform to a standard format such as ASCII, rather the sequence is arbitrary and thus unintelligible to any who intercept it.

After the encrypted command message is formed, it is transmitted three times to the integral modules in the area under surveillance to ensure accurate reception and operation of the surveillance system. Once the message is sent, the program directs the command encrypter/control processor to return to scanning the front panel keyboard.

When the CCU has already been powered up and the front panel power switch is actuated to shut down the CCU, the program in the command encryptor/control processor 470 directs the formation of a shutdown message which provide for the orderly shutdown and conservation of electric power of the integral modules 100, sensors 200 and power supply 300. After the shutdown message is sent three times, the program ends and the CCU is deactivated.

Figure 8B:
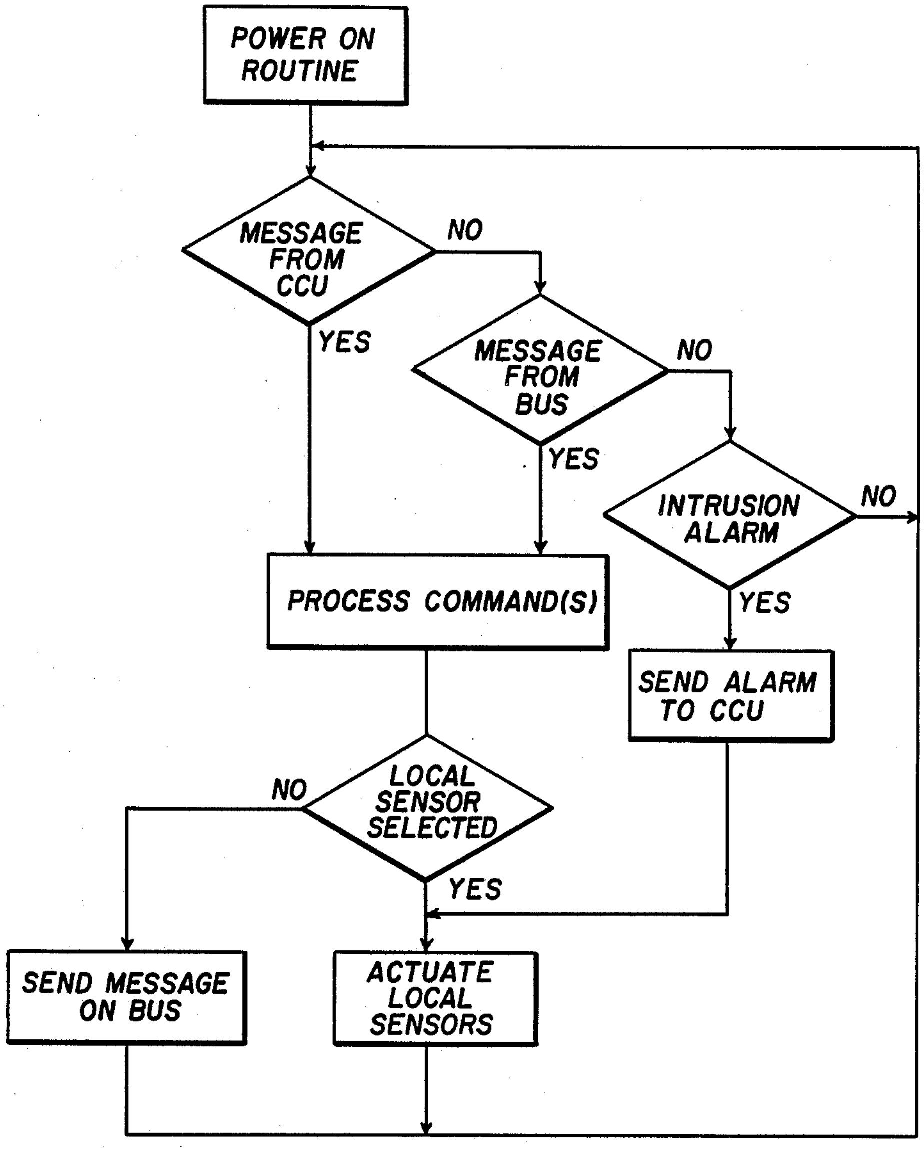

FIG. 8*b* shows a flowchart of the operation of the command decrypters 170 in the integral modules 100. The integral module is conventionally reset and initialized when power is first applied from the power supply 300. At that point, which may be at the end of the installation of the system, electric power is provided only to VHF command receiver 150 and the command decrypter 170. The integral module then listens for a command signal from the CCU 400, the other integral module via the data communication bus, or from one of several intrusion alarms that may be directly connected to the module. Upon receipt of a command from either of the first two sources, the message is processed for valid identification numbers, correct format, and is error checked. Valid commands are then sent to the other integral module via the bus connector 175 or the local sensors 200 are activated and the video and audio signals are transmitted to the CCU 400 via the microwave transmitter 120.

The local activation takes place by switch matrix 180 selecting sensor signals from one of the connectors 174.

If another integral module has been selected to transmit a sensor signal not connected to the present integral module, no other part of the present module need be actuated and the program directs the present module to be reset. If another integral module has been selected to transmit a sensor signal which is connected to the present integral module, the switch matrix 180 of the present module is actuated to connect the selected sensor signal input through on of the connectors 174 to the bus connector 175. In this way, signals from a sensor not directly connected through connectors 174 to an integral module may be transmitted by that module. If the present integral module has been selected to transmit a sensor signal which is either connected directly to it by conductors 174 or by the bus connector 175, power is applied to the selected sensor and the selected module's microwave transmitter. In this way, command signals may be received by one of a plurality of integral modules which can then transmit signals from a selected sensor to which it is not directly connected. Finally, when a shutdown command is received, the program directs the reset of the integral module and the deactivation of the sensors.

When an intrusion alarm is activated microprocessor controller 172 receives an appropriate message from the intrusion sensor via the bus connector 175. In response, the microprocessor controller 172 activates the microwave transmitter 120 which sends another suitable alarm message to the CCU. The alarm message may be imposed by a suitable alarm tone generator on one of the audio subcarriers. The controller 172 also actuates a predetermined one of the sensors 200 for transmission of its video and audio signals to the CCU. In a maintenance monitoring mode of operation, the CCU is already powered up and so is alerted by the intrusion message to sound an alarm for the operator. The intrusion message is detected by a conventional tone decoder which is advantageously positioned after the appropriate subcarrier demodulator 4302 and the descrambler 4306.

It will be understood that the system of the present invention may alternatively include a duplex rather than a simplex command signal communication link. In such an alternative system, the integral modules would transmit suitable acknowledgment messages to the CCU when the CCU's commands had been received and acted upon, or periodically in order to maintain operation of a CCU which is programmed to shut down the surveillance system in the event of keyboard inactivity for a predetermined time period. The acknowledgment messages would be generated by the microprocessor controllers 172. Duplex operation is also advantageous in an embodiment of the present invention in which the programming of the microprocessor controllers 170 can be changed. An acknowledgment message can be transmitted by the integral module after commands have been received and successfully processed by the microprocessor controller 172.

It is also possible to provide a surveillance system in accordance with the present invention in which an integral module 100, a sensor 200 and a battery power supply are packaged together in a self-contained portable unit. The internal components and operation of the combined unit remain otherwise unchanged, but the enhanced portability of such an embodiment, allowing the combined unit to be hand carried into an aircraft or other area to be put under surveillance, is advantageous in some security applications. Also, the system of the present invention can be readily integrated into, and serve as an extension of, existing closed circuit television systems which are present at many airports. The present invention can extend the area under surveillance by such an airport security system by including aircraft interiors, airport ramps and outdoor areas otherwise inaccessible to the usual permanent installation, for maintenance monitoring and other applications.

In another embodiment, transmission of the audio and video signals from the integral modules 100 may be accomplished in a fixed frame or single frame format. In such an embodiment, a conventional video frame grabber, a processor and a modem may be added to the transmitter 120 between the varactor-modulated oscillator 123 and the CLEAR/ENCRYPT switch 122. The frame grabber converts the input video signal to stored digital data which is then positionally scrambled under the control of the processor which can, for example, comprise one or more PALs containing conventional firmware. The processor would not typically employ the same algorithm as the scrambler 1211, although any suitable technique for scrambling pixel positions might be employed. The scrambled data is then read from the frame grabber and placed onto the communication link to the varactor-modulated oscillator 123 by the audio modem. The lower data rate of transmission afforded by this fixed frame format increases the effective range of the integral module because a narrower noise bandwidth receiver may be employed in the CCU 400.

The present invention has been described in relation to a particular embodiment which is intended in all respects to be illustrative rather than restrictive. Alternative embodiments will become apparent to those of ordinary skill in the art to which the present invention pertains without departing from its spirit and scope. Accordingly, the scope of the present invention is defined by the appended claims rather than the foregoing description that is intended in all respects to be illustrative and not restrictive.

What is claimed is:

1. A surveillance system for remotely monitoring an area, comprising:

a plurality of selectively controllable sensors located at predetermined positions proximate the area being monitored, each sensor comprising at least one video camera and a plurality of microphones and generating an output electrical signal, with one of said microphones being arranged to provide a noise free signal;

a plurality of integral modules electrically connected to the sensors, each integral module comprising a first antenna for transmitting the output signal from a selected one of the sensors, a second antenna for receiving encrypted command signals, means for decrypting the command signals and for selectively operating the sensors;

first power means for supplying electrical power to the plurality of sensors and the plurality of integral modules;

command and control means for remotely activating and selecting the integral modules and the sensors, comprising a command encrypter for generating the encrypted command signals, a third antenna for receiving the output signal transmitted by the integral modules, a fourth antenna for transmitting the encrypted command signals to the integral modules, means for displaying and reproducing the output signal received by the third antenna, and means for recording the output signal received by the third antenna; and second power means for supplying electrical power to the command and control means.

2. The system of claim 1, further comprising a backup power means for supplying electrical power to the plurality of sensors and to the plurality of integral modules when the first power means is inactivated.

3. The system of claim 1, wherein the area being monitored is the interior of an aircraft, the sensors are located to monitor covertly the interior, and the integral modules are mounted totally within the aircraft.

4. The system of claim 3, wherein each of the plurality of integral modules is mounted at a different window location of the aircraft.

5. The system of claim 1, wherein each integral module further comprises means for scrambling the output signal from the selected one of the sensors and the command and control means further comprises means for descrambling the output signal received by the third antenna.

6. The system of claim 1, wherein the integral modules are activated by a signal from an intrusion detector.

7. The system of claim 1, wherein the selected one of the sensors is automatically inactivated after a predetermined time period has elapsed.

8. The system of claim 1, wherein the area being monitored is the interior of a plurality of aircraft, the sensors are located to monitor covertly the plurality of aircraft, and the integral modules are mounted totally within the aircraft.

9. The system of claim 8, wherein each of the plurality of integral modules is mounted at a different window location of the aircraft.

10. The system of claim 1, wherein each sensor comprises two microphones for providing a stereophonic output signal.

11. The system of claim 1, wherein the means for recording the output signal comprises a video image printer and a video tape recorder.

12. The system of claim 1, wherein the first antenna is a resonant-cavity-backed, microstrip dipole, and the first and third antennas operate at L-band.

13. The system of claim 1, wherein the area being monitored is exterior to an aircraft, and the sensors and the integral modules are located in the aircraft.

14. The system of claim 1, wherein the means for decrypting the command signals and for selectively operating the sensors is remotely programmable.

15. The system of claim 1, wherein the means for decrypting the command signals and for selectively operating the sensors generates an acknowledgment message which is transmitted to the command and control means.

16. A surveillance system for remotely monitoring an interior of an aircraft, comprising:

a plurality of video and audio sensors mounted within the aircraft to monitor covertly different fields of regard within the aircraft's interior;

control means operatively connected to the plurality of sensors for controlling an operation of each of the sensors in response to command signals transmitted from a location outside the aircraft;

first transmitting and receiving means, including at least one antenna, mounted entirely within the interior of the aircraft for selectively transmitting signals from the plurality of video and audio sensors to the location outside the aircraft and for receiving the command signals; and second transmitting and receiving means, including at least one antenna, disposed at the location outside the aircraft for transmitting the command signals and for receiving the signals from the plurality of video and audio sensors.

17. The system of claim 16, further comprising means for scrambling the signals selectively transmitted from the plurality of video and audio sensors, and means for descrambling the signals received from the plurality of video and audio sensors.

18. The system of claim 16, wherein the antenna in the first transmitting and receiving means is a resonant-cavity-backed, microstrip dipole.

19. The system of claim 16, wherein the control means is remotely programmable in response to signals transmitted from a location outside the aircraft.

20. The system of claim 16, wherein the first transmitting and receiving means selectively transmits the sensor signals at a reduced data rate for increasing an effective range of the first transmitting and receiving means.

21. A surveillance system for remotely monitoring an interior of an aircraft, comprising:

a plurality of video and audio sensors mounted within the aircraft to monitor covertly different fields of regard within the aircraft's interior wherein the plurality of video and audio sensors includes at least one microphone arranged to provide a noise reference signal;

control means operatively connected to the plurality of sensors for controlling an operation of each of the sensors in response to command signals transmitted from a location outside the aircraft;

first transmitting and receiving means, including at least one antenna, mounted entirely within the interior of the aircraft for selectively transmitting signals from the plurality of video and audio sensors to the location outside the aircraft and for receiving the command signals; and second transmitting and receiving means, including at least one antenna, disposed at the location outside the aircraft for transmitting the command signals and for receiving the signals from the plurality of video and audio sensors.

22. A surveillance system for remotely monitoring an interior of an aircraft, comprising:

a plurality of video and audio sensors mounted within the aircraft to monitor covertly different fields of regard within the aircraft's interior;

control means operatively connected to the plurality of sensors for controlling an operation of each of the sensors in response to command signals transmitted from a location outside the aircraft;

first transmitting and receiving means, including at least one antenna, mounted entirely within the interior of the aircraft for selectively transmitting signals from the plurality of video and audio sensors to the location outside the aircraft and for receiving the command signals;

second transmitting and receiving means, including at least one antenna, disposed at the location outside the aircraft for transmitting the command signals and for receiving the signals from the plurality of video and audio sensors; and means for fully annotating the signals received from the plurality of video and audio sensors.

* * * * *